C. C. LAWRENCE.
Thill-Coupling.
No. 68,757.
Patented Sept. 10, 1867.
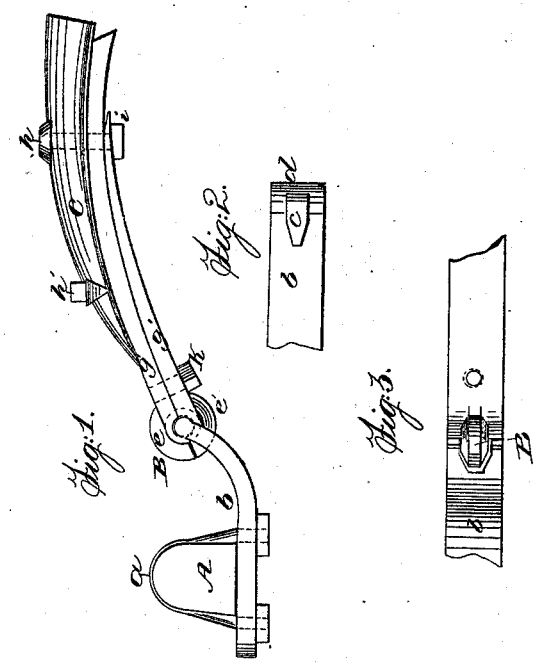

United States Patent Office.

COOK C. LAWRENCE, OF HOMER, MICHIGAN.

Letters Patent No. 68,757, dated September 10, 1867.

---

IMPROVEMENT IN THILL-COUPLING.

---

*The Schedule referred to in these Letters Patent and making part of the same.*

---

TO ALL WHOM IT MAY CONCERN:

Be it known that I, COOK C. LAWRENCE, of Homer, in the county of Calhoun, and State of Michigan, have invented a new and useful Improvement in Thill-Coupling; and I do hereby declare that the following is a full, clear, and exact description thereof, which will enable those skilled in the art to make and use the same, reference being had to the accompanying drawings, forming part of this specification, in which—

Figure 1 represents my improved coupling connected with a thill and axle.

Figure 2 is a top view of the clip-plate.

Figure 3 is a partial top view of the coupling.

Similar letters of reference indicate corresponding parts.

This invention relates to an improved plan of constructing a coupling for the thills or poles of carriages and wagons, and consists in bolting together two plates on the under side of the pole or thills, provided with segments of disks on their ends, which match, when closed, to form nearly a complete disk, in the centre of which is a hole for receiving the end of a plate on the bottom of the axle-clip. The ends of the plate are slotted to receive the periphery of the disk, and they are so connected that the thills are held fast while they are readily coupled and uncoupled, as hereinafter more particularly described.

A represents an axle, on which is an ordinary clip, $a$, with an under plate, $b$, projecting forward, and curved upward at the end, in which is a slot, $c$, fig. 2, leaving a cross-pin, $d$, at the extremity, that is made round to fit in a hole in the disk B, which is formed of two parts $e\ e'$, one of which parts, $e$, is formed on the end of a plate, $g$, that lies next to the under side of the thill C, and the other part, $e'$, is formed on the end of a separate plate, $g'$. The plate $g$ is fastened to the thill C with bolts $h\ h'$; and the plate $g'$ is secured to the forward end of the plate $g$ by a nut, $i$, on the bolt $h$, in such a manner that the end with the disk segment $e'$ on it may be opened to stand apart from the disk segment $e$ far enough to admit the cross-pin $d$ on the under plate $b$, in order to effect the coupling, which is done by drawing the plates together, and closing the segments of the disk upon the pin $d$, while the disk itself enters the slot $c$. The plates $g\ g'$ are drawn and held together by a screw-bolt, $k$, placed just behind the disk B.

This connection of the plates is easily and quickly made, and the coupling is neat, cheap, and secure. As it wears away the screw-bolt $k$ keeps it adjusted, so that it will not rattle or get out of order.

Having thus described my invention, what I claim as new, and desire to secure by Letters Patent, is—

The plates $g\ g'$, provided with disk segments $e\ e'$, in combination with the slotted clip-plate $b$, constructed and operating substantially as herein described.

COOK C. LAWRENCE.

Witnesses:
KING P. ALLEN,
HENRY C. ATWOOD.